July 12, 1966

J. R. YOUNKIN 3,261,006

HEADING SELECTOR

Filed Oct. 21, 1963

INVENTOR.
James R. Younkin
BY D. Carl Richards
Attorney

July 12, 1966  J. R. YOUNKIN  3,261,006
HEADING SELECTOR

Filed Oct. 21, 1963 2 Sheets-Sheet 2

INVENTOR.
James R. Younkin
BY D. Care Richards
Attorney

United States Patent Office 3,261,006
Patented July 12, 1966

3,261,006
HEADING SELECTOR
James R. Younkin, Mineral Wells, Tex., assignor to Mitchell Industries, Inc., Mineral Wells, Tex., a corporation of Texas
Filed Oct. 21, 1963, Ser. No. 317,513
10 Claims. (Cl. 340—199)

This invention relates to guidance systems and more particularly to a system for obtaining an error heading signal.

In systems involving guidance of vehicles as in aircraft control, an autopilot or a computer system is frequently employed to exercise supervisory control and to produce command functions as to the course the craft is to follow. Autopilots are well-known in which a desired heading can be introduced into the autopilot system with the result that the aircraft automatically will fly the course given until a change is desired. The present invention is primarily related to a system for developing an electrical signal which is proportional to the difference between the heading of the aircraft and some preselected different heading. The heading error signal thus developed may be employed in an autopilot system for steering the craft to the desired pre-selected heading or it may be employed in computer mechanisms to carry out navigation functions as may be assigned to a computer operation.

More particularly in accordance with the present invention, there is provided a system for changing a heading signal for a guidance system having a course indicator rotatably mounted on a shaft. An error signal generator has one element mounted in fixed position. A second element is mounted for a rotation on said shaft. A mounting means normally couples the second element to the indicator. Means are provided for disengaging the second element from the indicator and for rotating the same to displace the second element relative to the first element to generate an error signal proportional to the amount of rotation.

In a preferred embodiment of the invention an inductive coupling between a primary winding symmetrical to said shaft is variably coupled to a pair of secondary windings whose axes are perpendicular to the axis of said shaft.

For a more complete understanding of the present invention and for further objects and advantages thereof, reference may now be had to the following description taken in conjunction with the accompanying drawings in which.

Figure 1:
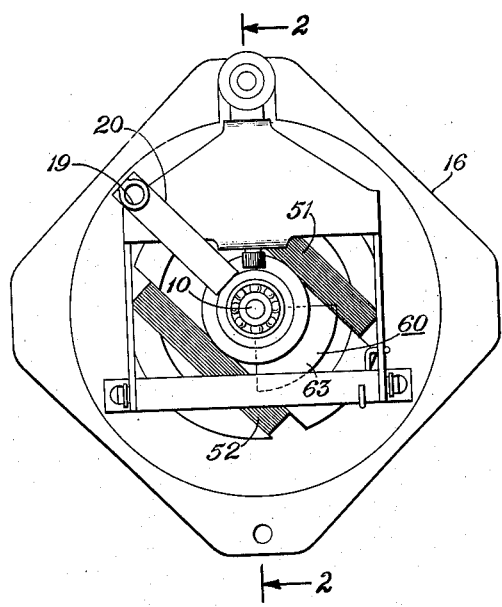
FIGURE 1 is a front view of an autopilot unit with the bezel and card removed.
Figure 2:
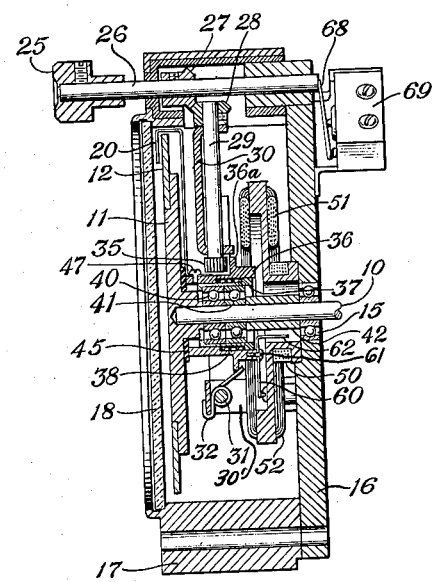
FIGURE 2 is a sectional view taken along line 2—2 of FIGURE 1.

In the embodiment illustrated in FIGURES 1 and 2, the invention is employed as a course selector for use in connection with an autopilot. In this embodiment, the autopilot may be of a type well-known in the art, in which an output shaft 10 generally is oriented such that it extends, end on, toward a pilot in a suitable housing and supports a disk unit 11 on which a card 12 is mounted. The card 12 is provided with indicia thereon for indicating to a pilot the heading at which the aircraft is being flown under the control of the autopilot. It will be noted that the shaft 10 is journaled in a ball bearing 15 which in turn is supported in a mounting plate 16. A bezel 17 is provided for supporting a front glass or cover plate 18. The pilot may observe the heading of the aircraft as it appears through a hole 19 in pointer 20. The autopilot functions to maintain such heading without deviation so long as the command to the autopilot remains unchanged.

The present invention involves a mechanism for conveniently changing the heading by producing an electrical signal which is proportional to the difference between the actual heading of the aircraft and some preselected new heading. Employed for this purpose, in the embodiment illustrated in FIGURES 1 and 2, is an audio-frequency device which may be preset by actuation of a selector knob 25 mounted on a shaft 26. A bevel gear 27, secured on shaft 26, mates with a bevel gear 28 which in turn is mounted on a stub shaft 29. The shaft 29 is journaled in a bracket 30. The bracket 30 includes a shaft 31 and is pivotally mounted at the lower end thereof by shaft 31 which is journaled in U-bar 30′ and affixed to the body of helical spring 32. The bracket 30 is biased by spring 32 so that it normally tends to be moved in a counterclockwise direction, maintaining bevel gear 28 in mesh with bevel gear 27. The bevel gear 28 rests upon the upper flange of the bracket 30. A short rubber cylinder or ring 35 is mounted on the lower end of shaft 29. The ring 35 is adapted to engage a flange 36a on a clutch member 36.

The clutch member 36 is cylindrical and is telescopically mounted on an inner member 37. A spring 38 exerts a force between the clutch members 36 and 37, tending to force them apart. The inner clutch member 37 is mounted on a pair of ball bearings 40 and 41 which are mounted on shaft 10. A thrust bearing-spacer 42 is positioned on shaft 10 between bearing 15 and bearing 41. An inwardly-depending ring on the front end of the member 37 serves to oppose the force of spring 38. The front face of the clutch member 36 normally engages a rubber washer 45 which is mounted on the rear face of the disk 11. The disk includes a hub section which is secured to the end of shaft 10. It will be noted that the marker 20 is a Z-shaped bar which is secured by a screw 47 to the surface of the clutch member 36 near the front end thereof.

With the structure thus far described, an operator may depress knob 25, thereby moving bracket 30 supporting the shaft 29 in a clockwise direction. The rubber ring 35 is thus brought into engagement with the flange 36a. As the knob 25 is depressed and turned, the ring 35 engages the rib 36a while disengaging the front end of clutch member 36 from the rubber washer 45. The pilot, by rotating the knob 25, may move the pointer 20 to any new selected heading indicated on the card 12. Upon release of the knob 25, the indicator becomes locked to the disk 11 through the frictional engagement between the clutch member 36 and the washer 45 to secure them one to the other.

A signal is generated which is proportional to the rotation of the indicator 20. In the embodiment illustrated in FIGURES 1 and 2, this is accomplished through the use of a special transformer configuration. More particularly, a primary winding 50 is mounted on a hub of the housing and surrounds the shaft 10. As shown, coil 50 is symmetrical with the shaft 10 and in position near the mounting plate 16. Two secondary coils 51 and 52 are mounted with their axes perpendicular to the axis of the primary winding 10 and in a symmetrical array with respect to the axis of the shaft 10. As shown in FIGURE 2, the coils 51 and 52 are elongated, thin, multi-turn coils. As shown in FIGURE 1, they are mounted with their axes in a plane parallel to the plane of the card 11 and with their axes passing through the axis of shaft 10.

A magnetic armature 60 is mounted, as by screw 61, on the rear face of the clutch member 36. The armature 60 includes a plate 62 which extends into the primary winding 50. Thus the armature 60 is L-shaped and includes a fan-shaped section 63 of such shape and dimensions as to extend partially into each of coils 51 and 52 when in a median position. A coupling or linkage is provided for coils 51 and 52 for the flux set up by excitation of the primary winding 50. When the indicator 20 is at the top of the card 12, the armature 60 is magnetically coupled equally to the coils 51 and 52 so that the voltages therefrom will be equal. The coils preferably are connected in series opposing relationship so that an error signal will be produced which depends in magnitude upon the extent to which the pointer 20 is rotated. The polarity of the error signal will be dependent upon the direction in which the pointer 20 is rotated. The error signal is then utilized in the autopilot system to force the autopilot system to change the heading of the aircraft to the degree necessary to bring the pointer 20 to the top of the card where the aircraft is in alignment with the newly selected heading and where the armature is symmetrical with respect to coils 51 and 52.

The system above-described provides a course selector which is positive in its action and in indicating the course to the pilot. The mechanism is simple and readily installed in many existing autopilots as well as readily adapting itself to new construction.

It will be noted that the end of the shaft 26 extends through the frame system and engages a lever arm 68 of a microswitch 69. The microswitch serves to short out the coils 51 and 52 to avoid undesirable maneuvering of the aircraft during any interval in which the pilot is changing the actual setting of the pointer 20. However, when the actual desired setting has finally been determined through rotation of the knob 25, the release of the knob 25 will open the switch 69 to clear the circuit leading from the terminals of the secondary coils 51 and 52. The error signal, which is related both in magnitude and sense to the difference between the present heading and the selected heading, will then be applied to the autopilot, causing the aircraft to achieve the new heading.

Figure 3:
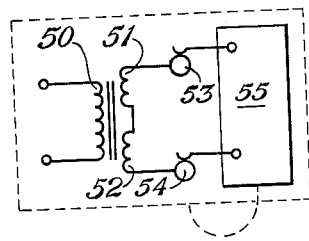
FIGURE 3 is a schematic diagram of the electrical circuit of the systems of FIGURES 1 and 2.

FIGURE 3 illustrates, in schematic form, the electrical circuit of the audio-frequency system illustrated in FIGURES 1 and 2. The primary winding 50 is adjustably coupled to the two secondary windings 51 and 52. The primary winding is excited from an audio-frequency alternating current source. The secondary windings are connected in series opposition. The output terminals 53 and 54 are connected by way of suitable plug contacts to the input of the autopilot 55 which serves to apply steering forces to the control system of the aircraft. The sense and magnitude of the forces are produced to bring the aircraft heading into alignment with the heading selected by actuation of the armature 60. So long as there is a heading error signal, the steering force will be produced by the autopilot 55. The autopilot will then cause the aircraft to attain and maintain a heading such that the voltages appearing at terminals 53 and 54 will be a null.

Figure 5:
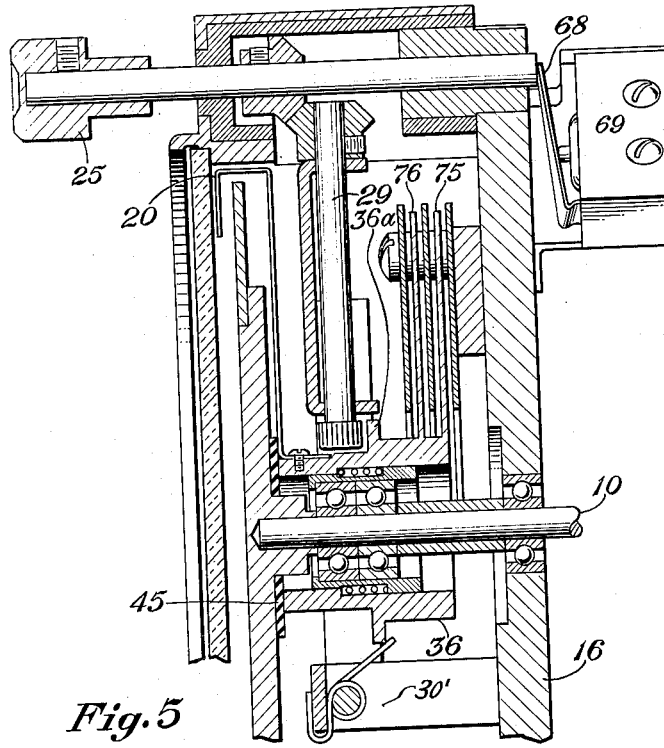
FIGURE 5 is a sectional view taken along line 5—5 of FIGURE 4.
Figure 4:
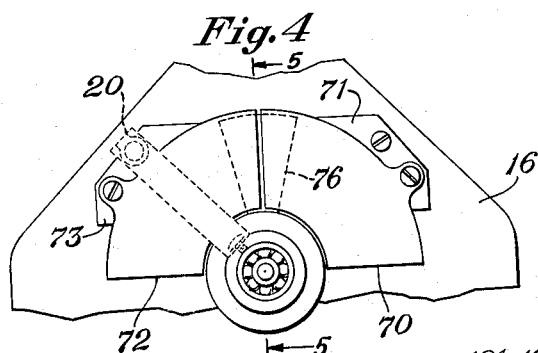
FIGURE 4 is a modification of the system for R.F. operation, the view being a fragmentary front view corresponding with FIGURE 1.
Figure 8:
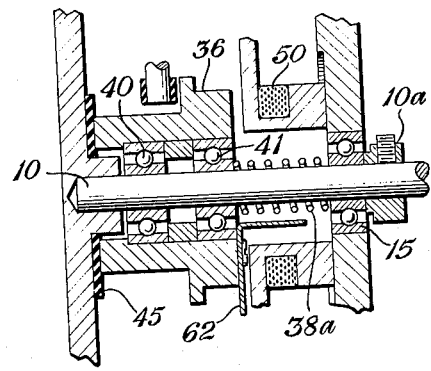
FIGURE 8 is a modification of a portion of the structure of the system of FIGURE 2.

FIGURES 4 and 5 illustrate an embodiment in which a capacitive pick-off is employed. The same autopilot structure is illustrated with the shaft 10 assumed to be the autopilot output shaft and shaft 29 is employed for selective engagement with the flange 36a on the clutch section 36.

In this embodiment, radio frequency operation is involved in which an error heading signal is developed by altering the relative orientation of sectors of a variable condenser. More particularly, a first condenser sector 70 is supported on a terminal block 71 which in turn is supported on the mounting plate 16. A second condenser sector 72 is mounted on a terminal block 73. The marker 20 (shown dotted in FIGURE 4) is supported on the front end of the clutch element 36 and is looped over the indicator card to provide a direct reading as to the heading as shown in FIGURE 5. A pair of condenser plates 75 and 76 are mounted on the rear end of the clutch element 36 as best seen in FIGURE 5. The condenser plate 76 is a pie-shaped sector of a disk. At balance, the condenser sectors 70 and 72 are in equal registration with the sectors 75 and 76. Such balance is present when the heading of the aircraft corresponds with the selected heading set in the autopilot.

As in the case of FIGURES 1 and 2, the pilot may select a new heading by actuation of control knob 25 to cause the lower end of shaft 29 to engage the rib 36a. This disengages the clutch element 36 from the washer 35, thereby permitting the marker 20 to be rotated to the newly selected heading. At the same time, the microswitch 69 is actuated to substitute a fixed condenser (not shown) in the control circuit of the autopilot, so that the aircraft will not maneuver during the setting selection.

Figure 6:
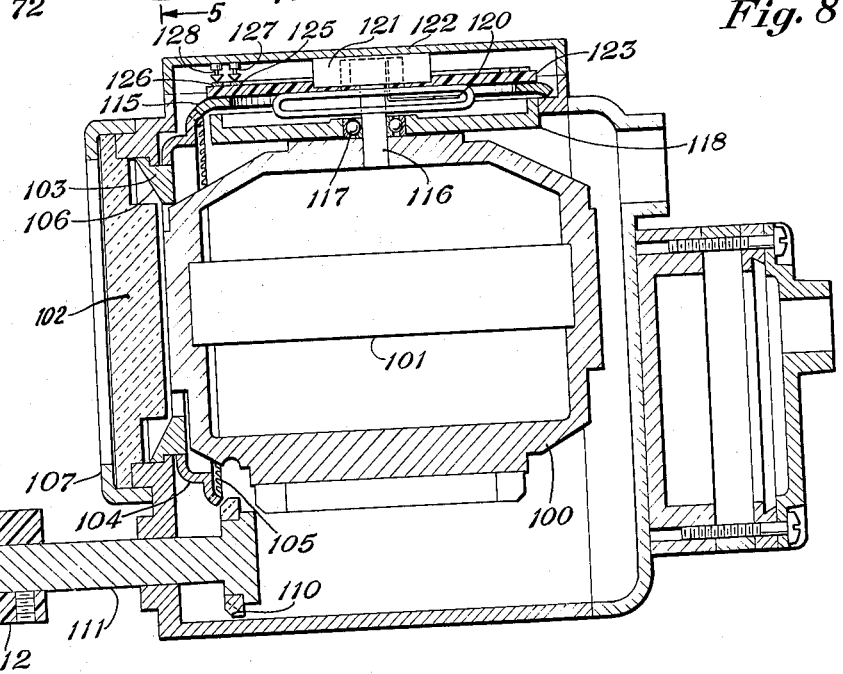
FIGURE 6 is a horizontal sectional view of a gyro.

In FIGURES 5 and 6 a gyro having an error signal sensor is illustrated. A gimbal-mounted gyro is positioned in a drum 100 having a heading marker ring 101 mounted on the outer gimbal. The heading may be observed through the front plate 102. A dial 103 is mounted behind the plate 102 on a dial gear 104. Gear 104 is a bevel gear having teeth on the rim 105 thereof. The dial 103 carries suitable compass graduations on the dial face 106. A cover plate 107 carries an aircraft indicia or pointer which is fixed with reference to the gyro housing or the airframe. However, the dial 103 is rotatable by engagement between the bevel gear rim 105 and a bevel gear 110 carried by a shaft 111 which includes a control knob 112.

The dial gear 104 engages a second bevel gear 115, which gear is mounted symmetrically with respect to the shaft 116 of the actuator gimbal. Shaft 116 is journaled in a bearing 117 which in turn is supported by an end plate 118.

Figure 7:
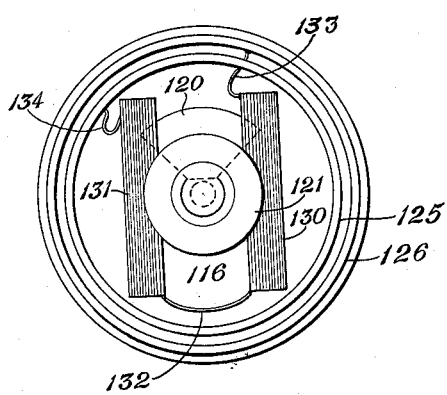
FIGURE 7 is a schematic illustration of the transformer configuration of FIGURE 6.

A magnetic armature 120 is mounted on shaft 116 and is linked to a primary transformer winding 121. Winding 121 is mounted on an end wall or cover 122 of the gyro housing and encircles the center axis of the shaft 116. An insulating disk 123 is rotationally mounted on the gear 115. The disk supports a pair of commutator rings 125 and 126 near the periphery thereof and on the side thereof adjacent to the cover 122. Brushes 127 and 128 provide for completing a circuit through the cover 122 to the slip rings 125 and 126, respectively. On the side of the plate 123 opposite the slip rings 125 and 126, there is mounted a pair of transformer secondary windings 130 and 131. The windings 130 and 131, as in the system of FIGURES 1 and 2, are elongated, thin, hollow windings. As best seen in FIGURE 7, they are mounted with their axes perpendicular to the axis of shaft 116. Two terminals, one from each of the windings 130 and 131, are connected together by conductor 132. The second terminal of coil 130 is connected by conductor 133 to the slip ring 126. The second terminal of coil 131 is connected by way of conductor 134 to the slip ring 125. It will be apparent from inspection of FIGURE 7 that the armature 120 is fan-shaped and is adapted to vary in equal and opposite senses the coupling between the primary winding 121 and the secondary windings 130 and 131. Thus, there may be produced an electrical signal proportional to the difference between the actual heading and a preselected new heading. Knob 112 is actuated to rotate dial 103 to the new heading, having reference to the indicia on plate 107. Rotation of the dial 103 causes rotation of the gear 115 to rotate the disk 123, thereby upsetting the null voltage appearing in the slip rings 125 and 126.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a heading selector for an autopilot having an output shaft which controls a heading indicator card, an adjustment means comprising:
   (a) a clutch element mounted for free rotation on said shaft and spring-biased into frictional engagement with said card,
   (b) a heading indicator supported by said clutch element and movable with reference to said card,
   (c) a fixed primary transformer winding mounted symmetrically with respect to said shaft,
   (d) a pair of fixed secondary windings mounted on opposite sides of said shaft with their axes perpendicular to said shaft,
   (e) a magnetic armature mounted on said clutch element having a first portion coupled to said primary winding and a second portion coupled to said secondary windings, and
   (f) rotatable means for engaging said clutch element to break said frictional engagement with said card while applying rotational force to said clutch element to vary the relative coupling between said armature and said secondary windings.

2. In a heading selector for an autopilot having an output shaft which controls a heading indicator card, an adjustment means comprising:
   (a) a clutch element mounted for free rotation on said shaft and spring-biased into frictional engagement with said card,
   (b) a heading indicator supported by said clutch element and movable with reference to said card,
   (c) a fixed primary transformer winding mounted symmetrically with respect to said shaft,
   (d) a pair of fixed secondary windings mounted on opposite sides of said shaft with their axes perpendicular to said shaft,
   (e) a magnetic armature mounted on said clutch element having a first portion coupled to said primary winding and a second portion coupled to said secondary windings,
   (f) rotatable means for engaging said clutch element to break said frictional engagement with said card while applying rotational force to said clutch element to vary the relative coupling between said armature and said secondary windings, and
   (g) an output unit connected to said secondary windings for comparing the voltages induced therein to produce an electrical signal proportional to the difference between the heading of said autopilot and the heading set in said indicator.

3. In a heading selector for an autopilot having an output shaft on which a heading indicator card is mounted, comprising an adjustment means:
   (a) a clutch element mounted for free rotation on said shaft and spring-biased into frictional engagement with said card,
   (b) a pointer supported by said clutch element and movable over the face of said card,
   (c) a fixed primary transformer winding mounted symmetrically with respect to said shaft,
   (d) a pair of fixed secondary windings mounted on opposite sides of said shaft with their axes perpendicular to said shaft,
   (e) a magnetic armature mounted on said clutch element having a first portion coupled to said primary winding and a second portion coupled to said secondary windings, and
   (f) rotatable means for engaging said clutch element to break said frictional engagement with said card while applying rotational force to said clutch element to vary the relative coupling between said armature and said secondary windings.

4. In a heading selector for an autopilot having an output shaft on which a heading indicator card is mounted, comprising an adjustment means:
   (a) a clutch element mounted for free rotation on said shaft behind said card and spring-biased into frictional engagement with said card,
   (b) a pointer looped over the face of said card from a support on said clutch element and movable with said clutch element to scan the face of said card,
   (c) a fixed primary transformer winding encircling said shaft,
   (d) a pair of fixed secondary windings mounted on opposite sides of said shaft with their axes perpendicular to said shaft,
   (e) a magnetic armature mounted on said clutch element having a first portion extending parallel to said shaft into said primary winding and a second portion perpendicular to said shaft extruding into both of said secondary windings, and
   (f) rotatable means for engaging said clutch element to break said frictional engagement with said card while applying rotational force to said clutch element to vary the relative coupling between said armature and said secondary windings.

5. In a heading selector for an autopilot having an output shaft on which a heading indicator card is mounted, an adjustment means comprising:
   (a) a clutch element mounted for free rotation on said shaft and spring-biased into frictional engagement with said card,
   (b) a pointer mounted on said clutch element and movable with reference to said card,
   (c) a pair of fixed condenser plates mounted adjacent to said shaft,
   (d) a movable condenser plate mounted on said clutch element having portions facing said fixed plates, and
   (e) rotatable means for engaging said clutch element to break said frictional engagement with said card while applying rotational force to said clutch element to vary the relative capacities between said movable plate and said fixed plates.

6. In a system for generating an electrical signal representative of the difference between the position of an element mounted for rotation on a first axis and a new position of arbitrary selection, the combination which comprises:
   (a) a pair of flat, hollow coils mounted with their axes perpendicular to and intersecting said first axis,
   (b) a primary winding mounted symmetrically to said first axis,
   (c) a magnetic armature mounted for rotation about said first axis and having an extension in the plane of the axes of said pair of coils for magnetically coupling said primary winding to said coils, and
   (d) circuit means for connecting said coils for comparison of the voltages induced therein to indicate the position of said armature relative to said coils.

7. A system for changing heading of a craft by means of an autopilot having a course indicator rotatably mounted on an autopilot shaft which comprises:
   (a) an error signal generator having a primary coil and two secondary coils mounted in fixed positions with the primary coil axis perpendicular to the axes of said secondary coils and an armature mounted for rotation on said shaft and coupling said primary coil to said secondary coil,
   (b) means for mechanically coupling said armature to said indicator, and
   (c) means for disengaging said armature from said indicator and for rotating the same to displace said armature relative to the coils to generate an error signal proportional to the rotation of said armature.

8. Heading reset means for an autopilot having a heading indicating scale member mounted on a position controlled shaft which comprises:
(a) idler means mounted on said shaft,
(b) an index means mounted on said idler means and extending over said scale member,
(c) a heading error signal network including first elements mounted in fixed relation with respect to said shaft and a second element mounted for movement with said idler means,
(d) means for normally locking said idler means to said scale member, and
(e) means for disengaging said idler means from said scale member and for rotating said idler means to change the position of said index means and the positional relationship between the first and second elements to produce an error signal dependent upon the rotation.

9. Heading reset means for an autopilot having a heading indicating card mounted on an autopilot output shaft which comprises:
(a) idler means mounted on said shaft behind said card,
(b) an index pointer mounted on said idler means and looped over the face of said card,
(c) a heading error signal network including first elements mounted in fixed relation with respect to said shaft and a second element mounted for movement with said idler means,
(d) means for normally locking said idler means to said card, and
(e) means for disengaging said idler means from said card and for rotating said idler means to change the position of said index pointer relative to said card and the relationship between said first elements and said second element to produce an output signal dependent upon the rotation.

10. In an autopilot having a heading indicator card mounted for rotation on the output shaft of an autopilot, the combination therewith which comprises:
(a) a pointer for cooperating with said card to provide an index,
(b) mounting means on said shaft for said pointer for rotation of said pointer relative to said card,
(c) a balanceable electrical network,
(d) means secured to mounting means for control of the balance of said network,
(e) means for normally maintaining said mounting means in fixed position relative to said card,
(f) control means coupled to said mounting means for disengaging the same from said card and for applying rotational forces thereto to unbalance said network in dependence upon rotation of said mounting means, and
(g) means positioned to be coupled to said control means for locking the input of said autopilot in a predetermined condition when said control means is actuated to disengage said mounting means from said card.

References Cited by the Examiner
UNITED STATES PATENTS

| | | | |
|---|---|---|---|
| 2,596,698 | 5/1952 | Laing | 340—198 |
| 3,176,264 | 3/1965 | Wail | 340—27 |

NEIL C. READ, *Primary Examiner.*

THOMAS B. HABECKER, *Examiner.*